United States Patent
Asahara

(10) Patent No.: US 8,964,236 B2
(45) Date of Patent: Feb. 24, 2015

(54) IMAGE FORMING APPARATUS, RESTORE CONTROL METHOD, AND STORAGE MEDIUM USING USER IDENTIFICATION INFORMATION

(75) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 13/034,578

(22) Filed: Feb. 24, 2011

(65) Prior Publication Data

US 2011/0211228 A1 Sep. 1, 2011

(30) Foreign Application Priority Data

Feb. 26, 2010 (JP) .................................. 2010-042972

(51) Int. Cl.
*G06K 15/00* (2006.01)
*G06F 11/14* (2006.01)
*B41J 15/04* (2006.01)

(52) U.S. Cl.
CPC .......... *G06F 11/1402* (2013.01); *G06K 15/402* (2013.01); *G06F 11/1469* (2013.01); *B41J 15/04* (2013.01)
USPC ........... 358/1.16; 358/1.1; 707/640; 707/609; 707/674; 707/676; 707/678; 707/680; 707/682; 714/6.1; 714/6.32

(58) Field of Classification Search
USPC ......... 707/640, 609, 674, 676, 678, 680, 682; 714/6.1–6.32; 358/1.16, 1.1
See application file for complete search history.

(56) References Cited

FOREIGN PATENT DOCUMENTS

| JP | 2002236623 A | 8/2002 |
|---|---|---|
| JP | 2005094057 A | 4/2005 |
| JP | 2005235184 A | 9/2005 |
| JP | 2006-095741 A | 4/2006 |
| JP | 2006095741 A | 4/2006 |
| JP | 2007-087001 A | 4/2007 |
| JP | 2008-109574 A | 5/2008 |
| JP | 2008109574 A | 5/2008 |
| JP | 2010009552 A | 1/2010 |

OTHER PUBLICATIONS

Bando, Client-Server System, Client Computer, and Recording Medium, Aug. 4, 2000, JP 2000215129 A.*

* cited by examiner

*Primary Examiner* — Martin Mushambo
(74) *Attorney, Agent, or Firm* — Canon USA Inc. IP Division

(57) ABSTRACT

An image forming apparatus is described where restoration of unnecessary data is prevented, and a storage area of the image forming apparatus is effectively utilized. When an option to increase the storage capacity of the image forming apparatus is selected, data backed up by a backup unit is set as data to be restored by a restore unit. When the option to increase the storage capacity of the image forming apparatus is not selected, data indicated by data identification information as being required data is set as data to be restored by the restore unit from among the data backed up by the backup unit.

12 Claims, 10 Drawing Sheets

FIG. 3

```xml
<?xml version="1.0" encoding="utf-8" ?>
<PersonalizedData SchemaVersion="1.0" >
  <Entry>
    <UserInfo>
      <UserInfoEntry UserName="Ada" LoginType="Local" IsDefault="true" />
    </UserInfo>
    <AppInfo AppID="App1" />
    <Root>
      <Node Name="UI" Path="/UI" >
        <Property Essential="true" >
          <Key>motherlang</Key>
          <Type>String</Type>
          <Value>ja</Value>
        </Property>
        <Property>
          <Key>fontsize</Key>
          <Type>int</Type>
          <Value>16</Value>
        </Property>
        <Property Opt="Dict" >
          <Key>ExtendDictionary</Key>
          <Type>boolean</Type>
          <Value>true</Value>
        </Property>
      </Node>
    </Root>
  </Entry>
</PersonalizedData>
```

FIG. 4

| USER IDENTIFIER | AUTHENTICATION TYPE | APPLICATION IDENTIFIER | RELATED OPTION IDENTIFIER | SEARCH KEY | VALUE | REQUIRED DATA FLAG |
|---|---|---|---|---|---|---|
| Ada | Local | App1 | none | motherlang | ja | true |
| Ada | Local | App1 | none | fontsize | 16 | false |
| Ada | Local | App1 | Dict | ExtendDictionary | true | false |
| Ada | Local | App2 | none | serveraddress | http://xxx/Ada | true |
| Billy | Remote:Domain1 | App1 | none | motherlang | en | true |
| Billy | Remote:Domain1 | App2 | none | serveraddress | http://xxx/Billy_2 | true |
| Claire | Local | App1 | none | motherlang | en | true |
| Claire | Local | App2 | none | serveraddress | http://xxx/Claire | true |
| Default | Local | App1 | none | motherlang | en | true |
| Default | Local | App2 | none | serveraddress | http://xxx/Default | true |

IMAGE FORMING APPARATUS, RESTORE CONTROL METHOD, AND STORAGE MEDIUM USING USER IDENTIFICATION INFORMATION

BACKGROUND OF THE INVENTION

1. Field of the Invention

The present invention generally relates to image forming and, more particularly, to an image forming apparatus, a restore control method, and a storage medium.

2. Description of the Related Art

An image forming apparatus has a function for storing and managing various pieces of data in a storage device. In many cases, an image forming apparatus has a function for extracting and backing up data from a predetermined time point, and restoring the backed up data as necessary. Further, an image forming apparatus may also have a function for equalizing data pieces in a plurality of image forming apparatuses by restoring backed up data on a separate image forming apparatus.

However, the state of an image forming apparatus when backed up data is restored may not be the same as when the data was extracted from a memory and backed up. Consequently, if all of the backed up data pieces are simply restored, there is the problem that unnecessary data may also be stored on the image forming apparatus.

Japanese Patent Application Laid-Open No. 2007-87001 discusses a method which, when backing up a setting value from an image forming apparatus, manages the data by distinguishing between common data that is common to image forming apparatuses and difference data that is different for each image forming apparatus. According to this method, an effective backup and restoration can be executed by distinguishing between image forming apparatus common data and image forming apparatus difference data.

However, the state of the image forming apparatus may not always be constant, and can change from that when the backup data was produced. In such a case, if the backup data is simply restored, even data not really required by the image forming apparatus may be restored. Since the capacity of the storage area in the image forming apparatus is usually limited, restoring unnecessary data can cause the problem that the data that is really required may not be able to be stored.

Further, there are also cases in which edited backup data produced by editing backup data and rewriting or merging the data, for example, is distributed to an unspecified number of image forming apparatuses. In this case, if the edited backup data is simply restored as described above, even data not really required by the image forming apparatus may be restored, which is a problem.

SUMMARY OF THE INVENTION

The present invention is directed to preventing restoration of unnecessary data, and effectively utilization of a storage area of an image forming apparatus.

According to an aspect of the present invention, an image forming apparatus includes a data management unit configured to manage data used by an application and data identification information for identifying whether the data is required data by associating with each other, a backup unit configured to back up the data managed by the data management unit, and a restore unit configured to restore the data backed up by the backup unit, wherein the data management unit is configured to, if an option to increase a storage capacity of the image forming apparatus is selected, set the data backed up by the backup unit as data to be restored by the restore unit, and if an option to increase a storage capacity of the image forming apparatus is not selected, set data indicated by the data identification information as being required data as data to be restored by the restore unit from among data pieces backed up by the backup unit.

According to the present invention, the restoration of unnecessary data can be prevented, and the storage area of the image forming apparatus can be effectively utilized.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of backup data.

FIG. 4 illustrates an example of a configuration of data managed by a data management unit.

DESCRIPTION OF THE EMBODIMENTS

Various exemplary embodiments, features, and aspects of the invention will be described in detail below with reference to the drawings.

Figure 1:
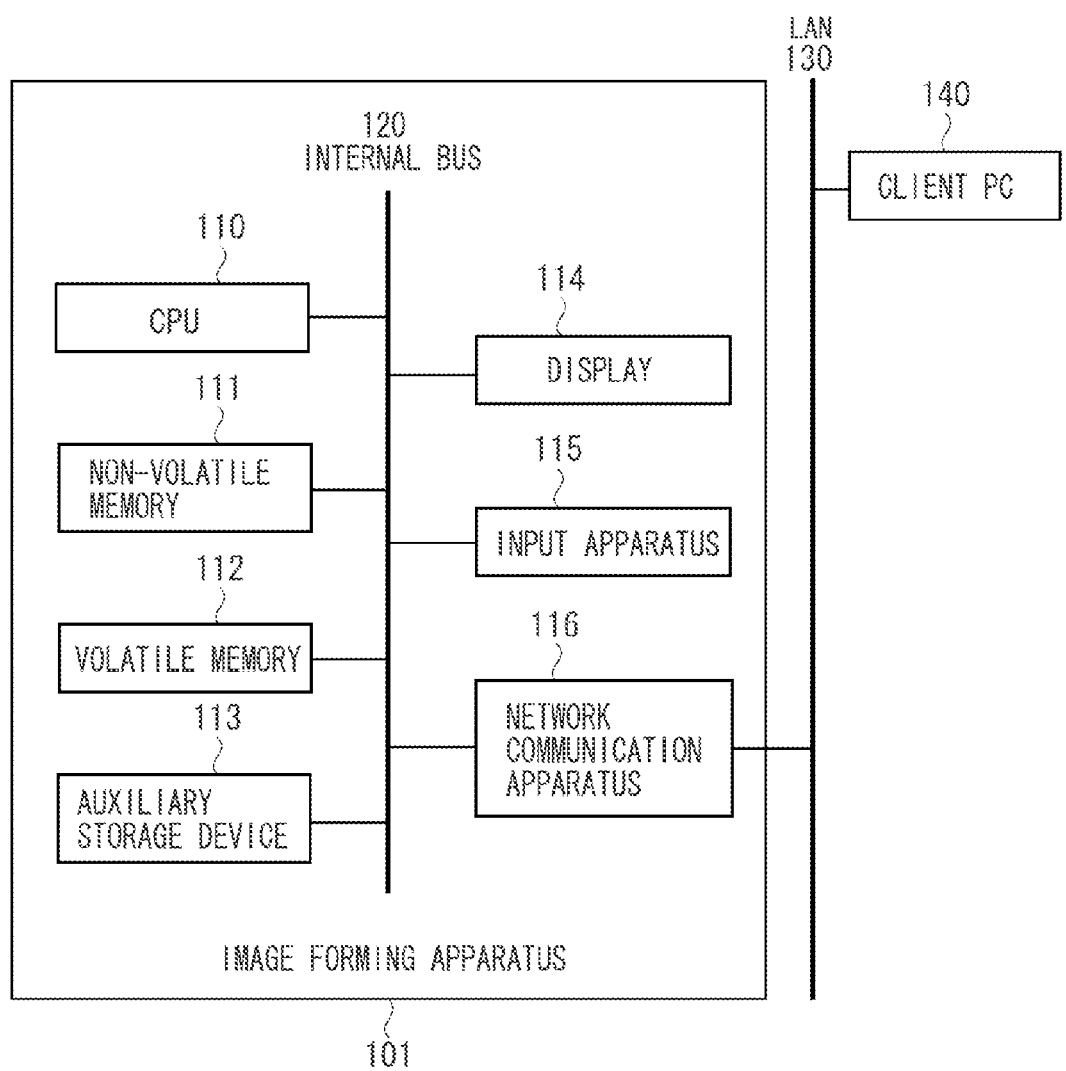
FIG. 1 illustrates an example of a hardware configuration in an image forming apparatus.

FIG. 1 illustrates an example of a hardware configuration in an image forming apparatus. A central processing unit (CPU) 110 executes programs and controls various processes. A non-volatile memory 111 is configured from a read-only memory (ROM), and stores the programs and data that are necessary in the initial stage of startup processing in an image forming apparatus 101. A volatile memory 112 is configured from a random access memory (RAM), and is utilized as a temporary storage location for programs and data. An auxiliary storage device 113 is configured from a large-capacity storage device, such as a hard disk and a RAM drive. The auxiliary storage device 113 is for storing large amounts of data and a program execution code. The auxiliary storage device 113 also stores data that needs to be stored for a longer time than the volatile memory 112. In the present exemplary embodiment, the auxiliary storage device 113 stores various software and shortcuts. A display 114 is a device for indicating information to a user using the image forming apparatus 101. In the present exemplary embodiment, the term "user" refers to all of the people who use the image forming apparatus 101.

An input apparatus 115 is an apparatus for receiving a selection instruction from the user, and transmitting the instruction to a program via an internal bus 120. A network communication apparatus 116 is an apparatus for communicating with a separate information processing apparatus via a network. The internal bus 120 is a communication bus for connecting the CPU 110, the non-volatile memory 111, the volatile memory 112, the auxiliary storage device 113, the display 114, the input apparatus 115, and the network communication apparatus 116 in a communicable state in the image forming apparatus 101. A local area network (LAN) 130 is a network for connecting the image forming apparatus 101 with another information processing apparatus in a communicable state. A client personal computer (PC) 140 is a separate information processing apparatus capable of communicating with the image forming apparatus 101 via the LAN 130. The below-described software configuration and the processing relating to the flowcharts described below are realized by the CPU 110 executing processing based on a program stored in the auxiliary storage device 113, for example.

Figure 2:
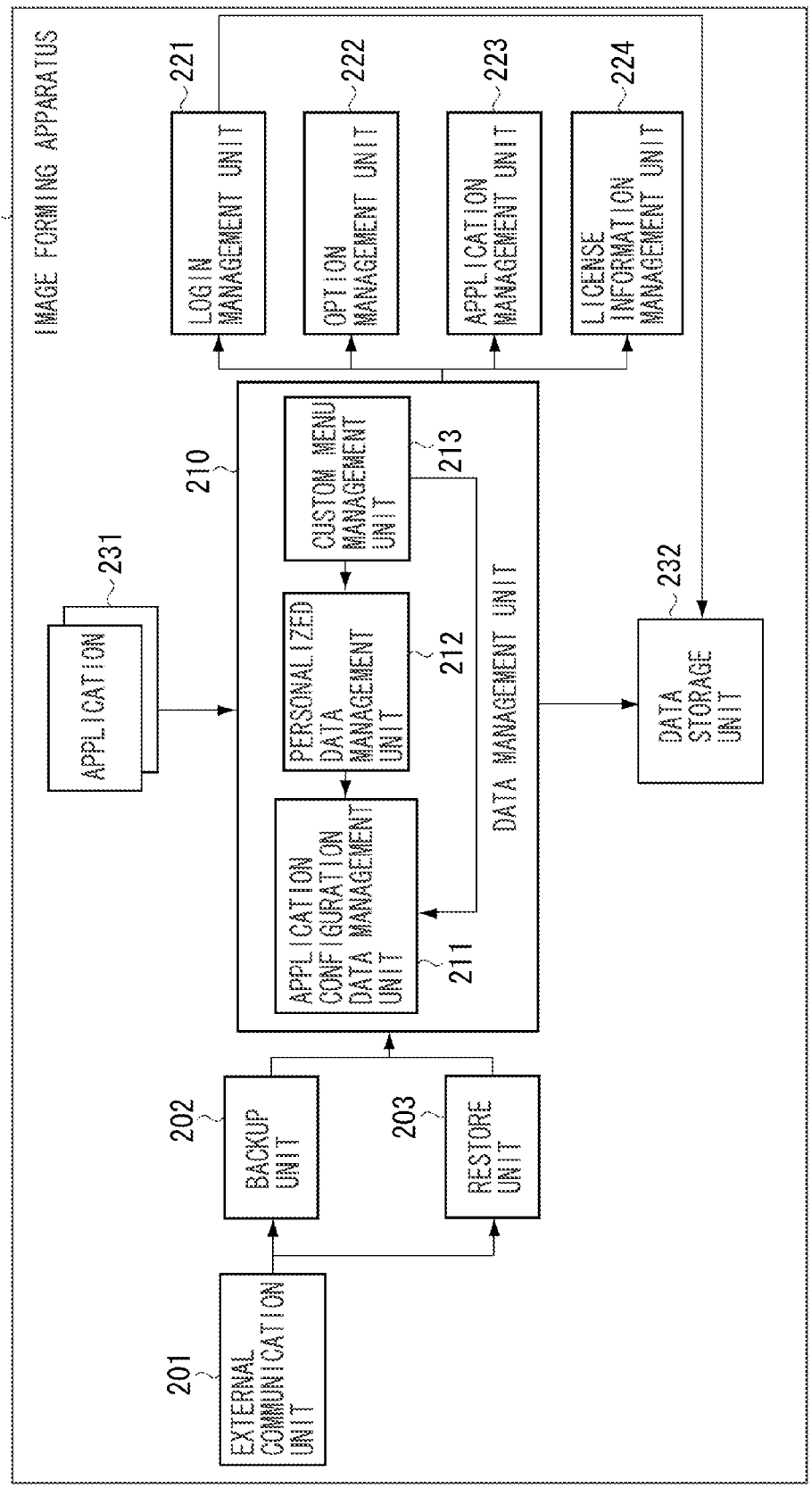
FIG. 2 illustrates an example of a software configuration in an image forming apparatus.

FIG. 2 illustrates an example of a software configuration in the image forming apparatus. An external communication unit 201 is a unit for performing network communication with the client PC 140 via the LAN 130. A backup unit 202 is a unit for making a backup request to a below-described data management unit 210 to extract data managed by the data management unit 210. The data extracted by the backup unit 202 will be referred to as "backup data". The backup data is a collection of data pieces managed by one or more types of the data management unit 210. The backup data includes an individual file for each unit configuring the data management unit 210, and all of the individual files is compressed as a Zip file. The backup data is transmitted to the client PC 140 by the external communication unit 201 for storage.

FIG. 3 illustrates a sample of the backup data. Here, an example of backup data in a personalized data management unit 212 will be described. The backup data illustrated in FIG. 3 is personalized data for a user referred to as "Ada" that is user-managed under local authentication. This personalized data is used by an application storing an application identifier "App1". A Property tag indicates the data that the user wishes to backup. In the example illustrated in FIG. 3, three pieces of data, motherlang, font size, and ExtendDictionary, in a search key indicated by a Key tag are backed up. A Type tag indicates the data type. A Value tag indicates the data the user wishes to backup.

A restore unit 203 is a unit that transfers the backup data to the data management unit 210, which is described below, and performs a restore request. The data that is transferred during the restore request needs to match the data managed by the respective units configuring the data management unit 210. Consequently, the restore unit 203 stores a function for unzipping the backup data, and selecting the file corresponding to the respective units configuring the data management unit 210 from among the obtained files. The data management unit 210 is a unit for managing the data utilized by an application 231 running on the image forming apparatus 101. The application 231 can register, delete, update, and refer desired data by the data management unit 210.

FIG. 4 illustrates an example of the data managed by the data management unit 210. A user identifier, an authentication type, an application identifier, and a related option identifier are attribute information associated with the data respectively managed by them. The user identifier, which is an example of user identification information, is an identifier for uniquely specifying a user. The user identifier indicates the person that the data belongs to (or the person who created the data). The authentication type will be described using the login management unit described below. The application identifier, which is an example of application identification information, is an identifier for uniquely specifying an application. The application identifier indicates the application to which that data is registered.

Similarly, the related option identifier, which is an example of option identification information, is an identifier for uniquely specifying an option. The option identifier indicates the options that need to be validated as a prerequisite for that data to be used. The "search key" is information that acts as a key for searching the managed data. The "value" is the registered data. The "required data flag", which is an example of data identification information, is a flag indicating whether the data needs to be set under any circumstances.

The data management unit 210 provides a function for, when a backup request from the backup unit 202 is received, producing the backup data and returning the produced backup data to the backup unit 202. The backup data can be broadly classified into two types. One type is data managed by the data management unit 210 which has received the backup request. Another type is data which is stored by the data management unit 210 that has not received the backup request and relates to the data management unit 210 that has received the backup request.

The data management unit 210 provides a function for, when a restore request is received from the restore unit 203, restoring the backup data that is additionally received from the restore unit 203. When executing restore processing, the data management unit 210 confirms the state of the image forming apparatus 101 and performs processing for excluding unnecessary data from a restore target. As the processing to exclude unnecessary data from the restore target, there are four methods that may be used based on the state of the image forming apparatus 101. Each method is described below.

A first method is processing in which, when a hard disk drive (HDD) option is not valid, only the required minimum amount of data is set for the restore target. Whether the HDD option is valid or not is determined by an option management unit 222. If the option management unit 222 determines that the HDD option is valid, the data management unit 210 sets the backup data for the restore target. If the option management unit 222 determines that the HDD option is not valid, the data management unit 210 sets the backup data for which the required data flag is set to "true" as the required data, and sets the required data for the restore target. Examples of required data may include a server address ("serveraddress" in the search key) of an application linked with a server, authentication information used in application authentication, and facsimile transfer setting information.

More specifically, the HDD option is an example of an option for increasing the storage capacity of the image forming apparatus. For the required data for the restore target, when the backup request is received from the backup unit 202, the data management unit 210 embeds information indicating that the data is the required data for the restore target in an Essential attribute of the Property tag.

A second method is processing in which only data related to the user who uses the image forming apparatus 101 is set for the restore target. The data management unit 210 acquires information about the user who uses the image forming apparatus 101 from a below-described login management unit 221. When the data management unit 210 receives the backup request from the backup unit 202, the data management unit 210 embeds information about the relevant user into the backup data itself. The data management unit 210 embeds the information about the user in a UserName attribute, a LoginType attribute, and an IsDefault attribute of the UserInfoEntry tag.

A third method is processing in which only data related to an application running on the image forming apparatus 101 is set for the restore target. The data management unit 210 acquires an application running on the image forming apparatus 101 from a below-described application management unit 223. When the data management unit 210 receives the backup request from the backup unit 202, the data management unit 210 embeds information about the relevant application into the backup data itself. The data management unit 210 embeds the information about the application in an AppID attribute of an AppInfo tag.

A fourth method is processing in which only data related to an option validated by the image forming apparatus 101 is set for the restore target. The data management unit 210 acquires an option validated by the image forming apparatus 101 from the option management unit 222 described below. When the data management unit 210 receives the backup request from the backup unit 202, the data management unit 210 embeds information about the relevant option into the backup data itself. The data management unit 210 embeds the information about the option in an Opt attribute of the Property tag.

In the present exemplary embodiment, the data management unit 210 includes three units that manage data.

One is an application configuration data management unit 211 which manages data for controlling operations of an application 231. The data managed by the application configuration data management unit 211 is referred to as "application configuration data".

Another unit is the personalized data management unit 212 which manages data for switching the operation for each user using the image forming apparatus 101. The data managed by the personalized data management unit 212 is referred to as "personalized data".

Yet another unit is a custom menu management unit 213 which manages data in a custom menu. The custom menu is an application in which, among the functions included in the image forming apparatus 101, a setting for a frequently used function is pre-registered, thereby allowing that function to subsequently be easily executed. Custom menu data refers to the above-described setting for a frequently used function. The data managed by the custom menu management unit 213 is referred to as "custom menu data".

A login management unit 221 provides an authentication function for the user using the image forming apparatus 101. The login management unit 221 supports two authentication types.

One is local authentication. The local authentication refers to a method in which user authentication is performed using a user database stored in the image forming apparatus 101. The user database is stored in the auxiliary storage device 113, for example, via a data storage unit 232. The user database includes at least a user identifier for uniquely identifying a user and an authentication code for confirming that a user is the correct user. When a user uses the image forming apparatus 101, the user identifier and the authentication code are transferred to the login management unit 221, and the login management unit 221 performs user authentication based on whether information matching the transferred information is registered in the user database.

The other authentication type is remote authentication. The remote authentication refers to a method in which user authentication is performed using a user database that is stored in an information device other than the image forming apparatus 101.

The login management unit 221 provides a function for acquiring a user list which is a list of the user identifiers registered in the user database for the local authentication. Further, the login management unit 221 provides a function for acquiring a user authentication history list which is a list of history information concerning user authentication performed in the past by the remote authentication.

The option management unit 222 manages the option functions that can be used by the image forming apparatus 101. The option function is a function for subsequently expanding the function of the application 231. For example, if there is an image transmitting function for transmitting image data formed by the image forming apparatus 101 to an external apparatus, an option function exists for converting the image format into an electronically-signed portable document format (PDF). The option management unit 222 stores and manages a plurality of option functions that can be used by the image forming apparatus 101 as an option list.

The application management unit 223 manages the application 231 running on the image forming apparatus 101. In addition, the application management unit 223 provides a function for acquiring an installed application list which is a list of application identifiers for uniquely identifying the application 231 running on the image forming apparatus 101.

A license information management unit 224 provides a function for managing a license of the application 231 running on the image forming apparatus 101. In addition, the license information management unit 224 provides a function for acquiring an application list which is a list of application identifiers of the application 231 for which a valid license exists.

Figure 5:
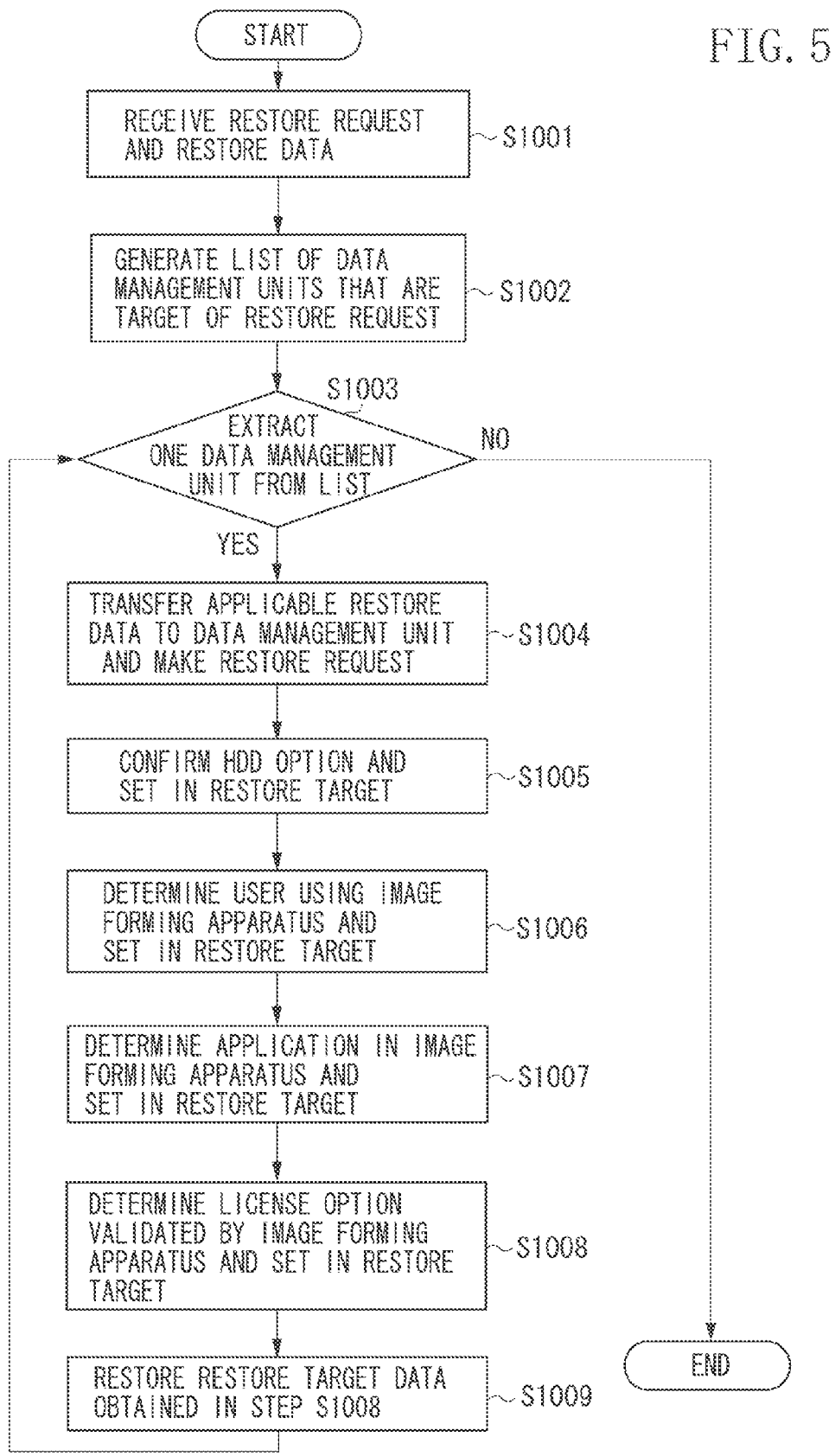
FIG. 5 is a flowchart illustrating an example of restore processing.

FIG. 5 is a flowchart illustrating an example of restore processing. In step S1001, the external communication unit 201 receives a restore request and backup data from the client PC 140. In step S1002, the restore unit 203 analyzes the restore request, and generates a list of the data management units, e.g. units 211, 212, and 213, that will serve as the restore target.

In step S1003, the restore unit 203 extracts one of the data management units from the list of the data management units that will serve as the restore target generated in step S1002. If the restore unit 203 successfully extracts one of the data management units from the list of the data management units that will serve as the restore target (YES in step S1003), the processing proceeds to step S1004. If the restore unit 203 determines that the list of data management units that will serve as the restore target is already empty (NO in step S1003), the restore processing is finished.

In step S1004, the restore unit 203 selects data corresponding to the data management unit extracted in step S1003 from the backup data. Then, the restore unit 203 transfers the data to the data management unit (e.g., the application configuration data management unit 211 etc.), and makes a restore request. For simplicity, the following description will be based on the assumption that the restore request was made to the data management unit 210.

In step S1005, the data management unit 210 narrows down the restore target based on the existence of the HDD option from among the backup data. The processing performed in step S1005 will be separately described in more detail using a flowchart illustrated in FIG. 6. In step S1006, the data management unit 210 narrows down the restore target based on the user from among the backup data. The processing performed in step S1006 will be separately described in more detail using a flowchart illustrated in FIG. 7.

In step S1007, the data management unit 210 narrows down the restore target based on the application from among the backup data. The processing performed in step S1007 will be separately described in more detail using a flowchart illustrated in FIG. 8. In step S1008, the data management unit 210 narrows down the restore target based on the license validated by the device from among the backup data. The processing performed in step S1008 will be separately described in more detail using the flowchart illustrated in FIG. 9.

In step S1009, the restore unit 203 restores the backup data for the restore target obtained in step S1008. The restored data is stored in the auxiliary storage device 113, for example, via the data storage unit 232.

The order of processing described in steps S1005 to S1008 is not limited to that illustrated in FIG. 5. Further, it is not necessary to perform all of the processing in steps S1005 to S1008. For example, only one step needs to be executed. In addition, among the processing in steps S1005 to S1008, the processing of an arbitrary number of steps may be combined and executed. The processing in steps S1005 to S1008 are one example of restore control processing.

Figure 6:
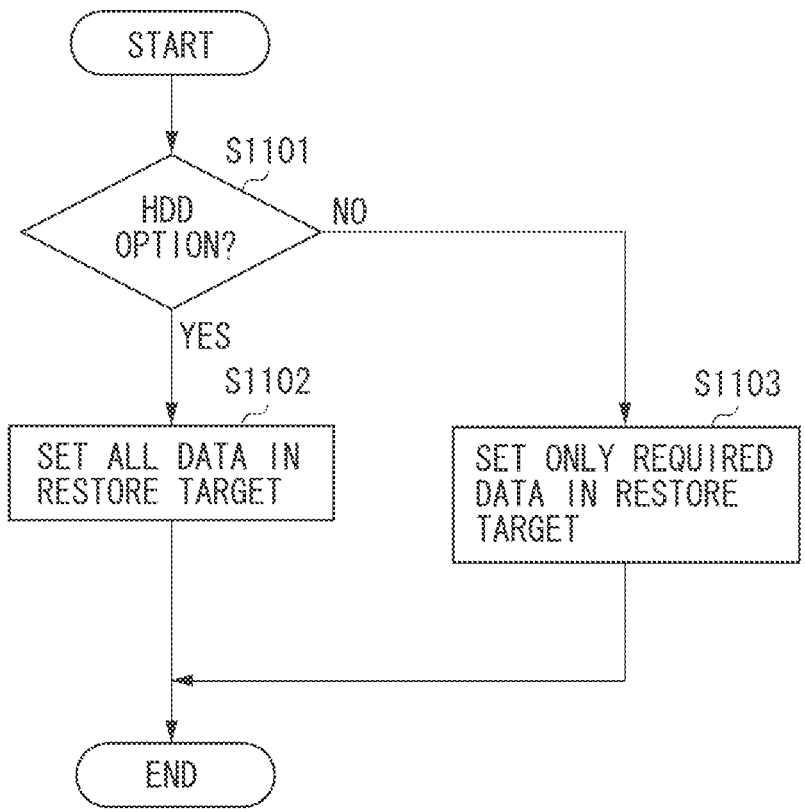
FIG. 6 is a flowchart illustrating an example of processing for limiting a restore target based on a hard disk drive (HDD) option.

FIG. 6 is a flowchart illustrating an example of processing for limiting the restore target based on the HDD option. In step S1101, the data management unit 210 determines whether the HDD option is valid. The state of the HDD option is managed by the option management unit 222. If the HDD option is valid (YES in step S1101), the data management unit 210 executes the processing in step S1102. If the HDD option is not valid (NO in step S1101), the data management unit 210 executes the processing in step S1103.

In step S1102, the data management unit 210 sets the backup data that is currently set for the restore target in the restore target as is.

In step S1103, among pieces of the backup data currently set for the restore target, the data management unit 210 sets only the data that is required even if the HDD is not valid in the restore target. More specifically, among pieces of the backup data currently set for the restore target, the data management unit 210 sets data which includes information indicating that it is required data for the restore target in the Essential attribute of the Property tag in the restore target.

Figure 7:
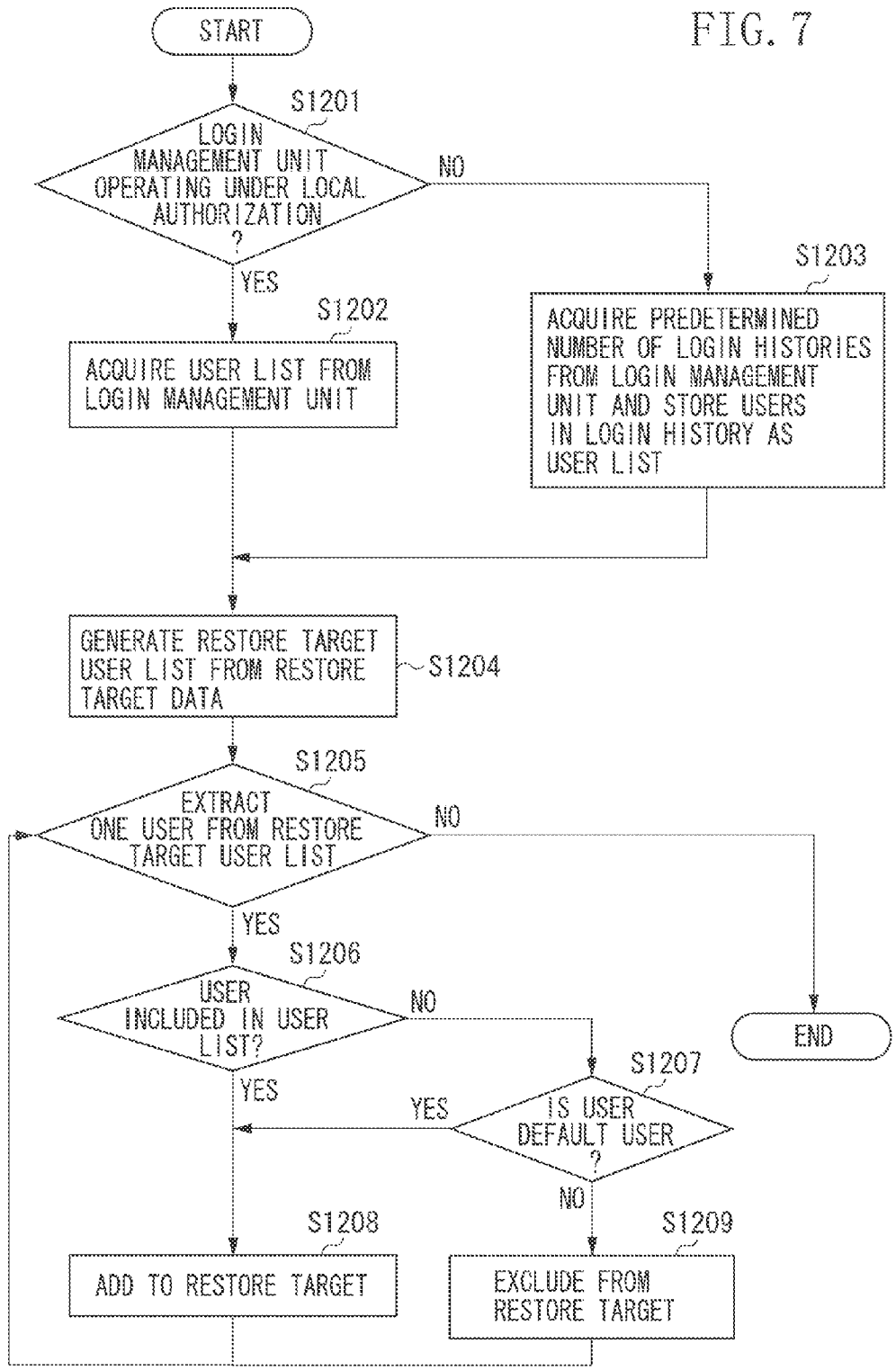
FIG. 7 is a flowchart illustrating an example of processing for limiting a restore target based on a user.

FIG. 7 is a flowchart illustrating an example of processing for limiting the restore target based on the user. In step S1201, the data management unit 210 determines whether the login management unit 221 is operating under the local authentication. If the login management unit 221 is operating under the local authentication (YES in step S1201), the data management unit 210 advances the processing to step S1202. If the login management unit 221 is not operating under the local authentication (NO in step S1201), the data management unit 210 advances the processing to step S1203.

In step S1202, the data management unit 210 acquires the user list from the login management unit 221. In step S1203, the data management unit 210 acquires only a predetermined number of login histories from the login management unit 221. Further, the data management unit 210 stores the users appearing in the login histories as the user list. The user list acquired in step S1202 or S1203 is an example of a list of user identifiers of users who can login to the image forming apparatus.

In step S1204, the data management unit 210 searches for users linked to the backup data set in the restore target, and generates a restore target user list. In step S1205, the data management unit 210 extracts one user from the restore target user list. If one user could be successfully extracted from the restore target user list (YES in step S1205), the data management unit 210 advances the processing to step S1206. If there is not even one user in the restore target user list (NO in step S1205), the data management unit 210 finishes the processing.

In step S1206, the data management unit 210 determines whether the user extracted in step S1205 is included in the user list generated in step S1202 or S1203. If the user extracted in step S1205 is included in the user list generated in step S1202 or S1203 (YES in step S1206), the data management unit 210 advances the processing to step S1208. If the user extracted in step S1205 is not included in the user list generated in step S1202 or S1203 (NO in step S1206), the data management unit 210 advances the processing to step S1207.

In step S1207, the data management unit 210 determines whether the user extracted in step S1205 is a default user. More specifically, the data management unit 210 determines whether the user extracted in step S1205 is a default user based on the IsDefault attribute of the UserInfoEntry tag. If the user extracted in step S1205 is the default user (YES in step S1207), the data management unit 210 advances the processing to step S1208. If the user extracted in step S1205 is not a default user (NO in step S1207), the data management unit 210 advances the processing to step S1209. The processing in step S1207 may be omitted.

In step S1208, the data management unit 210 adds the backup data relevant to the user extracted in step S1205 to the restore target. In step S1209, the data management unit 210 excludes the backup data relevant to the user extracted in step S1205 from the restore target.

Figure 8:
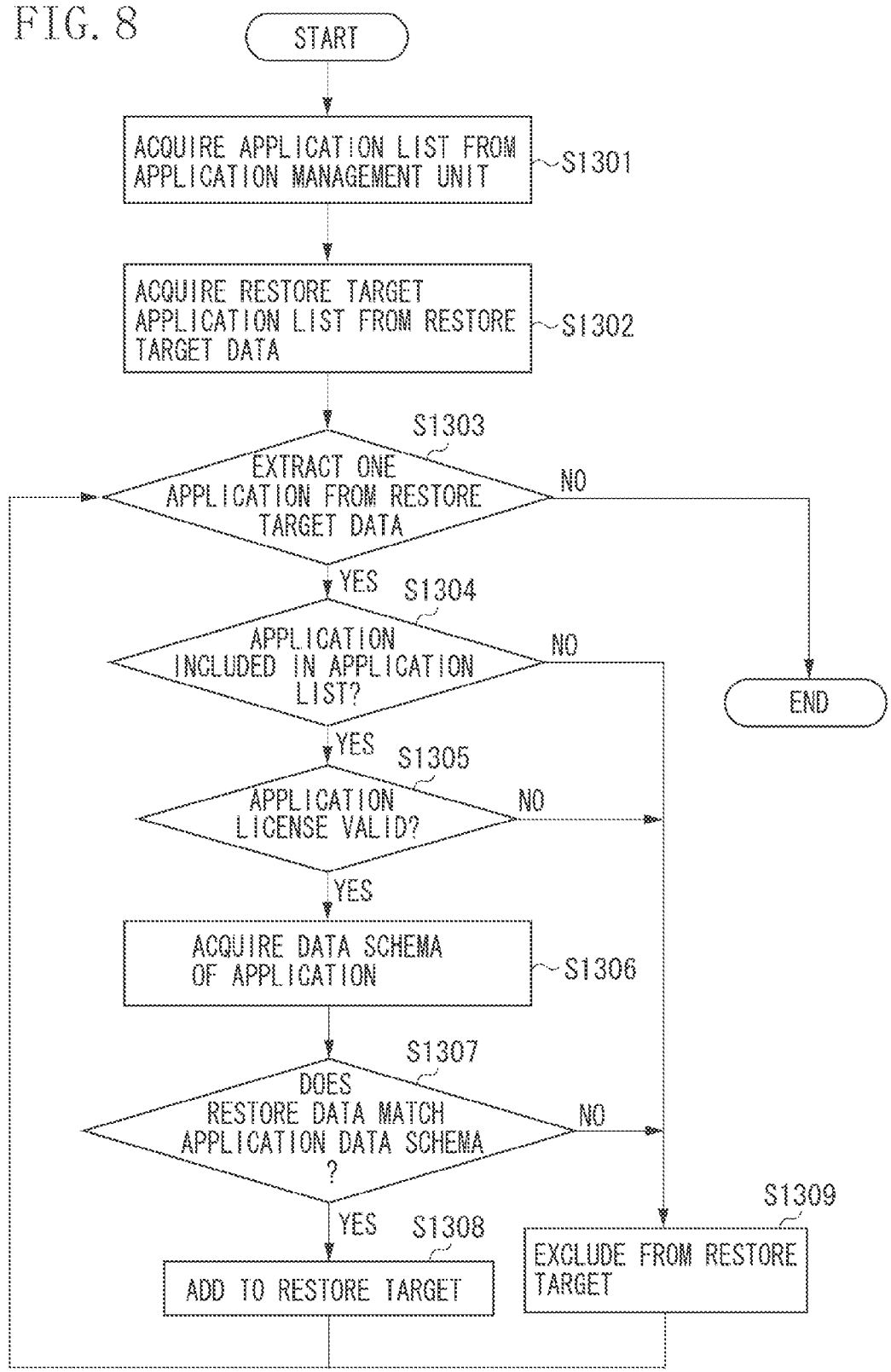
FIG. 8 is a flowchart illustrating an example of processing for limiting a restore target based on an application.

FIG. 8 is a flowchart illustrating an example of processing for limiting the restore target based on an application. In step S1301, the data management unit 210 acquires an application list from the application management unit 223.

In step S1302, the data management unit 210 searches for applications linked to the backup data set in the restore target, and generates a restore target application list. More specifically, the data management unit 210 searches for applications linked to by the backup data set in the restore target based on the AppID attribute of the AppInfo tag, and generates the restore target application list.

In step S1303, the data management unit 210 extracts one application from the restore target application list generated in step S1302.

In step S1304, the data management unit 210 determines whether the application extracted in step S1303 is included in the application list acquired in step S1301. If the application extracted in step S1303 is included in the application list acquired in step S1301 (YES in step S1304), the data management unit 210 advances the processing to step S1305. If the application extracted in step S1303 is not included in the application list acquired in step S1301 (NO in step S1304), the data management unit 210 advances the processing to step S1309.

In step S1305, the data management unit 210 determines whether a license of the application extracted in step S1303 is valid. The data management unit 210 transfers an identifier of the application extracted in step S1303 to the license information management unit 224, and receives a result of a determination regarding whether the license is valid. If the license of the application extracted in step S1303 is valid (YES in step S1305), the data management unit 210 advances the processing to step S1306. If the license of the application extracted in step S1303 is not valid (NO in step S1305), the data management unit 210 advances the processing to step S1309.

In step S1306, the data management unit 210 acquires a data schema of the application extracted in step S1303 from the application 231.

In step S1307, the data management unit 210 determines whether the data set in the restore target matches the data schema acquired in step S1306. If the data set in the restore target matches the data schema acquired in step S1306 (YES in step S1307), the data management unit 210 advances the processing to step S1308. If the data set in the restore target does not match the data schema acquired in step S1306 (NO in step S1307), the data management unit 210 advances the processing to step S1309.

In step S1308, the data management unit 210 adds the backup data relevant to the application extracted in step S1303 to the restore target. In step S1309, the data management unit 210 excludes the backup data relevant to the application extracted in step S1303 from the restore target. Further, the processing in steps S1305 to S1307 may be omitted.

Figure 9:
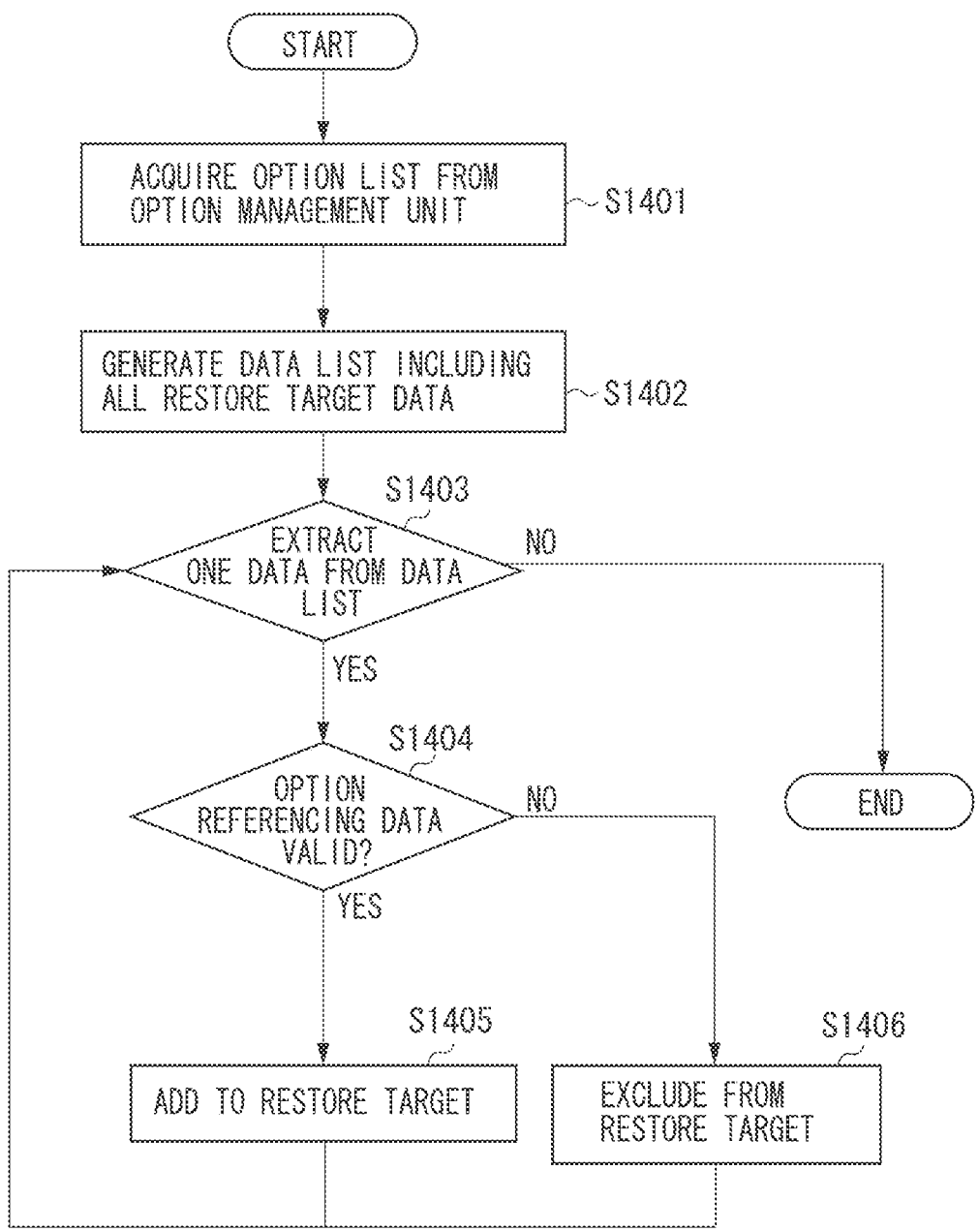
FIG. 9 is a flowchart illustrating an example of processing for limiting a restore target based on an option.

FIG. 9 is a flowchart illustrating an example of processing for limiting the restore target based on an option. In step S1401, the data management unit 210 acquires an option list from the option management unit 222. In step S1402, the data management unit 210 generates a data list including all pieces of the restore target data. In step S1403, the data management unit 210 extracts one data from the data list generated in step S1402.

In step S1404, the data management unit 210 analyzes the option relevant to the data extracted in step S1403, and determines whether the option is valid. More specifically, the data management unit 210 determines whether the option is valid by analyzing the Opt attribute of the Property tag. If the option is valid (YES in step S1404), the data management unit 210 advances the processing to step S1405. If the option is not valid (NO in step S1404), the data management unit 210 advances the processing to step S1406.

In step S1405, the data management unit 210 adds the data extracted in step S1403 to the restore target. In step S1406, the data management unit 210 excludes the data extracted in step S1403 from the restore target. According to the above processing, a system which performs restore processing for only the required data can be provided.

Figure 10:
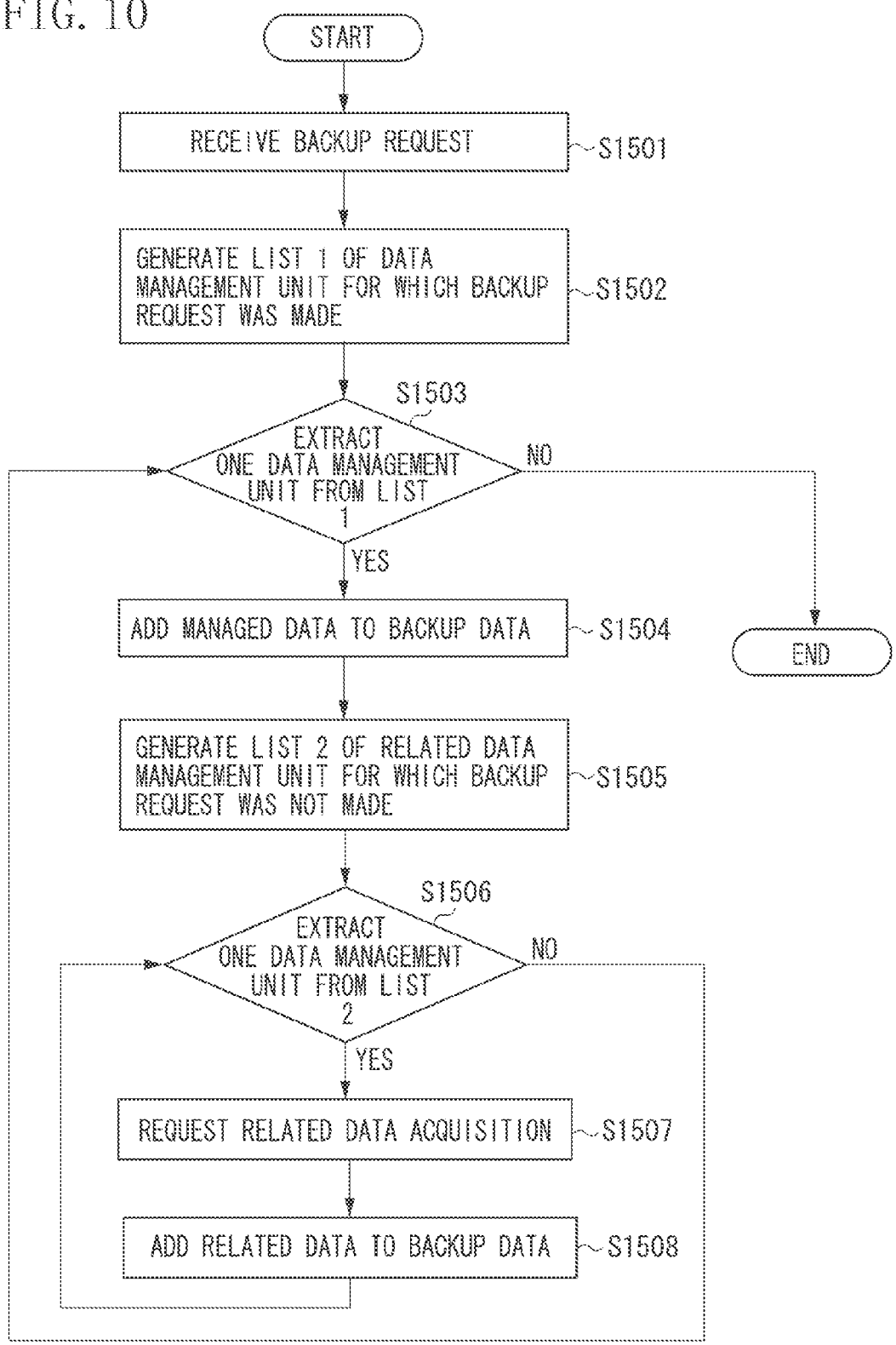
FIG. 10 is a flowchart illustrating an example of backup processing.

FIG. 10 is a flowchart illustrating an example of backup processing. In step S1501, the external communication unit 201 receives a backup request from the client PC 140. In step S1502, the backup unit 202 generates a list of the data management units 210 for which the backup request was made. In the description of FIG. 10, the list of the data management units 210 for which the backup request was made is referred to as "list 1".

In step S1503, the backup unit 202 acquires one data management unit 210 from the list 1. In step S1504, the data management unit 210 adds the data that itself manages to the backup data.

In step S1505, the data management unit 210 generates a list of other data management units 210 relevant to the data that the data management unit 210 itself stores. In the description of FIG. 10, the list of the data management units 210 generated in step S1505 is referred to as "list 2". In step S1506, the data management unit 210 extracts one data management unit 210 from the list 2. In the description of FIG. 10, the data management unit 210 acquired in step S1506 is referred to as the "relevant data management unit".

In step S1507, the data management unit 210 makes a request to the relevant data management unit to generate backup data for the relevant data. In step S1508, the data management unit 210 adds the backup data for the relevant data generated by the relevant data management unit in step S1507 to the backup data in step S1504. According to the above processing, a system can be provided which generates backup data that is free from unnecessary data.

Different possible configurations of the first exemplary embodiment will now be described. The external communication unit 201 may perform external communication using a unit other than a network. For example, communication may be performed by a wireless LAN or near field communication. External communication may also be performed by exchanging data via a universal serial bus (USB) memory. Further, the backup data may also be stored in a separate internal storage area rather than externally. In such a case, the external communication unit 201 is not provided.

The backup unit 202 may be configured so as to compress the backup data. Based on such a configuration, the size of the data handled by the external communication unit 201 is reduced, so that communication costs can be decreased. In this configuration, the restore unit 203 needs to store a function for decompressing the backup data.

The backup unit 202 may also handle the backup data as individual files. In this case, the external communication unit 201 and the restore unit 203 need to include a unit that can handle a plurality of files. Alternatively, the data may be a format reconfigured as a single file. In this case, the restore unit 203 needs to include a unit which extracts the data corresponding to the appropriate data management unit 210 from among the single file of the backup data.

The backup unit 202 and the restore unit 203 may be configured so as to extract and restore the backup data directly from the auxiliary storage device 113 via the data storage unit 232. In this case, the data management unit 210 does not need to have a function for extracting and restoring the backup data.

The data management unit 210 may also include various other units. For example, the data management unit 210 may include a log management unit for managing a log, and a document management unit for managing a document.

In the above exemplary embodiment, although the login management unit 221 does not distinguish among local authentications, the login management unit 221 may be configured to do so. For example, to individually distinguish all of the image forming apparatuses, the individual image forming apparatuses can be distinguished with using a serial ID that uniquely identifies them. In this case, the serial ID is stored in the authentication type illustrated in FIG. 4, and the data management unit 210 performs a control in which the user is not recognized as being the same user unless the same serial ID is given. Alternatively, distinguishing may be performed based on an identifier of the login management unit 221 that controls the local authentication. In this case, an identifier of the login management unit 221 is stored in the authentication type illustrated in FIG. 4, and the data management unit 210 performs a control in which the user is not recognized as being the same user unless the same identifier is provided.

Thus, according to the above exemplary embodiments, the restoration of unnecessary data can be prevented, and the storage area of an image forming apparatus can be effectively utilized.

Aspects of the present invention can also be realized by a computer of a system or apparatus (or devices such as a CPU, a micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium). Such recording mediums may include, for example, one or more of a hard disk, a RAM or ROM memory, a storage of distributed computing systems, a rewritable or write once optical disk (such as a compact disc (CD), digital versatile disk (DVD), Blu-ray Disc (BD)), a USB memory, a flash memory device, a memory card, and/or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-042972 filed Feb. 26, 2010, which is hereby incorporated by reference herein in its entirety.

What is claimed is:

1. An image forming apparatus comprising:
 a data management unit configured to manage data used by an application and user identification information for identifying a user who created the data by associating with each other;
 a backup unit configured to backup the data managed by the data management unit; and
 a restore unit configured to restore the data backed up by the backup unit,
 wherein the data management unit is configured to set data managed by being associated with the user identification information included in a list of user identification information on users who are allowed to log into the image forming apparatus from among data pieces backed up by the backup unit as data to be restored by the restore unit, and exclude data not managed by being associated with the user identification information included in the list from among the data pieces backed up by the backup unit from the data to be restored by the restore unit.

2. An image forming apparatus comprising:
 a data management unit configured to manage data used by an application and application identification information for identifying the application by associating with each other;
 a backup unit configured to back up the data managed by the data management unit; and
 a restore unit configured to restore the data backed up by the backup unit,
 wherein the data management unit is configured to set data managed by being associated with the application identification information included in a list of applications to be restored from among data pieces backed up by the backup unit as data to be restored by the restore unit, and exclude data not managed by being associated with the application identification information included in the list of applications to be restored from among the data pieces backed up by the backup unit from the data to be restored by the restore unit.

3. The image forming apparatus according to claim 2, wherein the data management unit is configured to set data that is managed by being associated with the application identification information included in the list of applications to be restored and matches a data schema of the application from among data pieces backed up by the backup unit as data to be restored by the restore unit as data to be restored by the restore unit, and exclude data not managed by being associated with the application identification information included in the list of applications to be restored or data that does not match the data schema of the application from among the data pieces backed up by the backup unit from the data to be restored by the restore unit.

4. The image forming apparatus according to claim 2, wherein the data management unit is configured to set data that is managed by being associated with the application identification information included in the list of applications to be restored, matches a data schema of the application and has a valid license of the application from among data pieces backed up by the backup unit as data to be restored by the restore unit, and exclude data not managed by being associated with the application identification information included in the list of applications to be restored, data that does not match the data schema of the application or data not having a valid license of the application from among the data pieces backed up by the backup unit from the data to be restored by the restore unit.

5. A method for restore control executed by an image forming apparatus, the method comprising:
 managing data used by an application and user identification information for identifying a user who created the data by associating with each other;
 backing up the managed data; and
 restoring the backed up data,
 wherein, if the data is managed, data managed by being associated with the user identification information included in a list of user identification information on users who are allowed to log into the image forming apparatus from among backed up data pieces is set as data to be restored, and data not managed by being associated with the user identification information included in the list from among the backed up data pieces is excluded from the data to be restored.

6. A method for restore control executed by an image forming apparatus, the method comprising:
 managing data used by an application and application identification information for identifying the application by associating with each other;
 backing up the managed data; and
 restoring the backed up data,
 wherein, if the data is managed, data managed by being associated with the application identification information included in a list of applications to be restored from among backed up data pieces is set as data to be restored, and data not managed by being associated with the application identification information included in the list of applications to be restored from among the backed up data pieces is excluded from the data to be restored.

7. The method according to claim 6, wherein the managing data sets data that is managed by being associated with the application identification information included in the list of applications to be restored and matches a data schema of the application from among data pieces backed up by the backing up as data to be restored by the restoring, and excludes data not managed by being associated with the application identification information included in the list of applications to be restored or data that does not match the data schema of the application from among the data pieces backed up by the backing up from the data to be restored by the restoring.

8. The method according to claim 6, wherein the data managing sets data that is managed by being associated with the application identification information included in the list of applications to be restored, matches a data schema of the application and has a valid license of the application from among data pieces backed up by the backing up as data to be restored by the restoring, and excludes data not managed by being associated with the application identification information included in the list of applications to be restored, data that does not match the data schema of the application or data not having a valid license of the application from among the data pieces backed up by the backing up from the data to be restored by the restoring.

9. A non-transitory storage medium storing a program configured to cause a computer to execute:
    managing data used by an application and user identification information for identifying a user who created the data by associating with each other;
    backing up the managed data; and
    restoring the backed up data,
    wherein, when the data is managed, data managed by being associated with the user identification information included in a list of user identification information on users who are allowed to log into the image forming apparatus from among backed up data pieces is set as data to be restored, and data not managed by being associated with the user identification information included in the list from among the backed up data pieces is excluded from the data to be restored.

10. A non-transitory storage medium storing a program configured to cause a computer to execute:
    managing data used by an application and application identification information for identifying the application by associating with each other;
    backing up the managed data; and
    restoring the backed up data,
    wherein, if the data is managed, data managed by being associated with the application identification information included in a list of applications to be restored from among backed up data pieces is set as data to be restored, and data not managed by being associated with the application identification information included in the list of applications to be restored from among the backed up data pieces is excluded from the data to be restored.

11. The storage medium according to claim 10, wherein the managing data sets data that is managed by being associated with the application identification information included in the list of applications to be restored and matches a data schema of the application from among data pieces backed up by the backing up as data to be restored by the restoring, and excludes data not managed by being associated with the application identification information included in the list of applications to be restored or data that does not match the data schema of the application from among the data pieces backed up by the backing up from the data to be restored by the restoring.

12. The storage medium according to claim 10, wherein the managing data sets data that is managed by being associated with the application identification information included in the list of applications to be restored, matches a data schema of the application and has a valid license of the application from among data pieces backed up as data to be restored by the restoring, and excludes data not managed by being associated with the application identification information included in the list of applications to be restored, data that does not match the data schema of the application or data not having a valid license of the application from among the data pieces backed up by the backing up from the data to be restored by the restoring.

* * * * *